(12) United States Patent
Hong et al.

(10) Patent No.: US 9,973,908 B2
(45) Date of Patent: May 15, 2018

(54) SHORT MESSAGE SERVICE READING METHOD AND DEVICE

(71) Applicant: Xiaomi Inc., Beijing (CN)

(72) Inventors: Feng Hong, Beijing (CN); Jiankai Zhao, Beijing (CN); Wankun Yang, Beijing (CN); Jianchun Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/213,818

(22) Filed: Jul. 19, 2016

(65) Prior Publication Data

US 2017/0086040 A1    Mar. 23, 2017

(30) Foreign Application Priority Data

Sep. 18, 2015 (CN) .......................... 2015 1 0599211

(51) Int. Cl.
| | |
|---|---|
| *H04W 4/14* | (2009.01) |
| *H04M 1/725* | (2006.01) |
| *H04L 12/58* | (2006.01) |
| *H04L 29/06* | (2006.01) |
| *H04W 4/12* | (2009.01) |
| *H04W 12/08* | (2009.01) |
| *G06Q 20/32* | (2012.01) |

(52) U.S. Cl.
CPC .............. *H04W 4/14* (2013.01); *H04L 51/14* (2013.01); *H04L 63/101* (2013.01); *H04M 1/72552* (2013.01); *H04W 4/12* (2013.01); *H04W 12/08* (2013.01); *G06Q 20/3255* (2013.01)

(58) Field of Classification Search
CPC ....... H04W 4/14; H04W 12/08; H04W 12/06; H04W 12/02; H04W 4/12; H04M 1/72552; H04L 51/14; H04L 63/101
See application file for complete search history.

(56) References Cited

U.S. PATENT DOCUMENTS

| | | | |
|---|---|---|---|
| 8,543,821 B1 | 9/2013 | Gabrielson | |
| 8,561,206 B1 | 10/2013 | Paul et al. | |

(Continued)

FOREIGN PATENT DOCUMENTS

| | | | |
|---|---|---|---|
| CN | 101072093 A | 11/2007 | |
| CN | 101252748 A | 8/2008 | |

(Continued)

OTHER PUBLICATIONS

Extended European Search Report dated Nov. 7, 2016 for European Application No. 16175767.9, 7 pages.

(Continued)

*Primary Examiner* — Nam Huynh
(74) *Attorney, Agent, or Firm* — Brinks, Gilson & Lione

(57) ABSTRACT

A method and device are provided for reading a SMS. In the method, the device receives reading request to read an SMS from a third party application. When the SMS is a SMS carrying sensitive information, the device determines whether the third party application belongs to an access authority list corresponding to the SMS, where the access authority list includes one or more applications having an authority of accessing the SMS. When the third party application belongs to the access authority list, the device feed the SMS back to the third party application.

20 Claims, 9 Drawing Sheets

(56) References Cited

U.S. PATENT DOCUMENTS

| | | |
|---|---|---|
| 9,043,918 B2 | 5/2015 | Bhattacharjee et al. |
| 2007/0043815 A1 | 2/2007 | Tsang et al. |
| 2009/0054038 A1 | 2/2009 | Ranjan et al. |
| 2009/0144829 A1 | 6/2009 | Grigsby et al. |
| 2010/0115289 A1 | 5/2010 | Han |
| 2011/0154040 A1 | 6/2011 | Bheemanna |
| 2012/0157049 A1 | 6/2012 | Eliovits et al. |
| 2012/0192287 A1 | 7/2012 | Cai et al. |
| 2012/0291103 A1 | 11/2012 | Cohen |
| 2013/0014212 A1 | 1/2013 | Cohen |
| 2013/0097203 A1 | 4/2013 | Bhattacharjee et al. |
| 2013/0097652 A1 | 4/2013 | Bhattacharjee et al. |
| 2014/0041038 A1 | 2/2014 | Lessin et al. |
| 2014/0128047 A1 | 5/2014 | Edwards et al. |
| 2014/0325601 A1 | 10/2014 | Sun |
| 2014/0349625 A1 | 11/2014 | Edwards et al. |
| 2015/0220734 A1 | 8/2015 | Nalluri et al. |
| 2015/0237011 A1 | 8/2015 | Bhattacharjee et al. |
| 2017/0208470 A1* | 7/2017 | Hu ..................... H04W 12/08 |

FOREIGN PATENT DOCUMENTS

| | | |
|---|---|---|
| CN | 102103537 A | 6/2011 |
| CN | 102810143 A | 12/2012 |
| CN | 102917346 A | 2/2013 |
| CN | 103079113 A | 5/2013 |
| CN | 103106578 A | 5/2013 |
| CN | 103116716 A | 5/2013 |
| CN | 103310135 A | 9/2013 |
| CN | 103310169 A | 9/2013 |
| CN | 103327492 A | 9/2013 |
| CN | 103514397 A | 1/2014 |
| CN | 103686716 A | 3/2014 |
| CN | 103761471 A | 4/2014 |
| CN | 103761472 A | 4/2014 |
| CN | 104202735 A | 12/2014 |
| CN | 104640116 A | 5/2015 |
| CN | 104657674 A | 5/2015 |
| CN | 104768139 A | 7/2015 |
| EP | 2 028 829 A1 | 2/2009 |
| JP | 2004-102394 A | 4/2004 |
| JP | 2007-164613 A | 6/2007 |
| JP | 2008-125614 A | 6/2008 |
| JP | 2010-278852 A | 12/2010 |
| JP | 2012-046406 A | 3/2012 |
| JP | 2012-132296 A | 7/2012 |
| JP | 2013-045384 A | 3/2013 |
| JP | 2014-039193 A | 2/2014 |
| KR | 10-2014-0033567 A | 3/2014 |
| KR | 10-2015-0005343 A | 1/2015 |
| KR | 10-2015-0065083 A | 6/2015 |
| KR | 10-2015-0075349 A | 7/2015 |
| RU | 2 408 069 C2 | 12/2010 |
| RU | 2 524 868 C2 | 8/2014 |
| WO | WO 2006/001524 A1 | 1/2006 |
| WO | WO 2010/026540 A1 | 3/2010 |
| WO | WO 2010/145811 A1 | 12/2010 |
| WO | WO 2013/055501 A1 | 4/2013 |

OTHER PUBLICATIONS

International Search Report dated Jun. 7, 2016 for International Application No. PCT/CN2015/099986, 4 pages.
Office Action dated Sep. 4, 2017 for Chinese Application No. 201510599836.2, 21 pages.
Office Action dated Oct. 31, 2017 for Japanese Application No. 2016-556275, 3 pages.
Office Action dated Nov. 21, 2017 for Japanese Application No. 2016-556266, 11 pages.
English translation of International Search Report dated Jun. 7, 2016 for International Application No. PCT/CN2015/099986, 2 pages.
English translation of International Search Report dated Jun. 22, 2016 for International Application No. PCT/CN2015/100007, 2 pages.
English Translation of International Search Report dated May 18, 2016 for International Application No. PCT/CN2015/099988, 2 pages.
Extended European Search Report dated Dec. 6, 2016 for European Application No. 16184845.2, 9 pages.
Extended European Search Report dated Feb. 8, 2017 for European Application No. 16176449.3, 10 pages.
Mulliner, Collin et al., "SMS-Based One-Time Passwords: Attacks and Defense," Network and Parallel Computing, Lecture Notes in Computer Science, 2013, pp. 150-159.
Office Action dated Aug. 28, 2017 for Chinese Application No. 201510600885.3, 8 pages.
Office Action dated May 26, 2017 for Korean Application No. 10-2016-7026752, 9 pages.
Office Action dated Jul. 17, 2017 for Korean Application No. 10-2016-7028071, 9 pages.
Partial European Search Report dated Nov. 7, 2016 for European Application No. 16176449.3, 6 pages.
Written Opinion dated Jun. 22, 2016 for International Application No. PCT/CN2015/100007, 3 pages.
Written Opinion dated May 17, 2016 for International Application No. PCT/CN2015/099988, 4 pages.
Written Opinion dated Jun. 7, 2016 for International Application No. PCT/CN2015/099986, 3 pages.
Office Action dated Jan. 29, 2018 for Japanese Application No. 2016-556782, 5 pages.
Office Action dated Nov. 21, 2017 for Russian Application No. 2016135920/08, 13 pages.
Office Action dated Nov. 23, 2017 for Russian Application No. 2016135980/07, 10 pages.
Office Action dated Dec. 5, 2017 for Russian Application No. 2016132970/08, 13 pages.
Office Action dated Feb. 27, 2018 for Chinese Application No. 201510599211.6, 8 pages.

* cited by examiner

SHORT MESSAGE SERVICE READING METHOD AND DEVICE

CROSS-REFERENCE TO RELATED APPLICATIONS

The present application is proposed based on and claims the priority to Chinese patent application No. 201510599211.6 filed on Sep. 18, 2015, the entire contents of which are incorporated into the present application by reference.

TECHNICAL FIELD

The present disclosure relates to the field of information security, particularly to a Short Message Service (SMS) reading method and device.

BACKGROUND

At present, a common authentication method is to perform safety verification by using a verification code carried in an SMS.

In an Android operating system, a third party application may be authorized to read an SMS. If the third party application is a malicious application, the third party application may read a verification code in the SMS so as to acquire an authority of executing a sensitive operation, such as an authority of executing a payment operation, and an authority of executing registration and login and so on.

SUMMARY

A method for reading an SMS is provided according to a first aspect of the embodiments of the present disclosure. The method includes that: a reading request to read an SMS is received from a third party application; when the SMS is an SMS carrying sensitive information, whether the third party application belongs to an access authority list corresponding to the SMS is detected, wherein an application in the access authority list has an authority of accessing the SMS; and when the third party application belongs to the access authority list, the SMS is fed back to the third party application.

A device for reading an SMS is provided according to a second aspect of the embodiments of the present disclosure. The device includes: a processor; and a memory configured to store an instruction executable by the processor. The processor is configured to: receive, from a third party application, a reading request to read an SMS; when the SMS is an SMS carrying sensitive information, determine whether the third party application belongs to an access authority list corresponding to the SMS, wherein an application in the access authority list has an authority of accessing the SMS; and when the third party application belongs to the access authority list, feed back the SMS to the third party application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
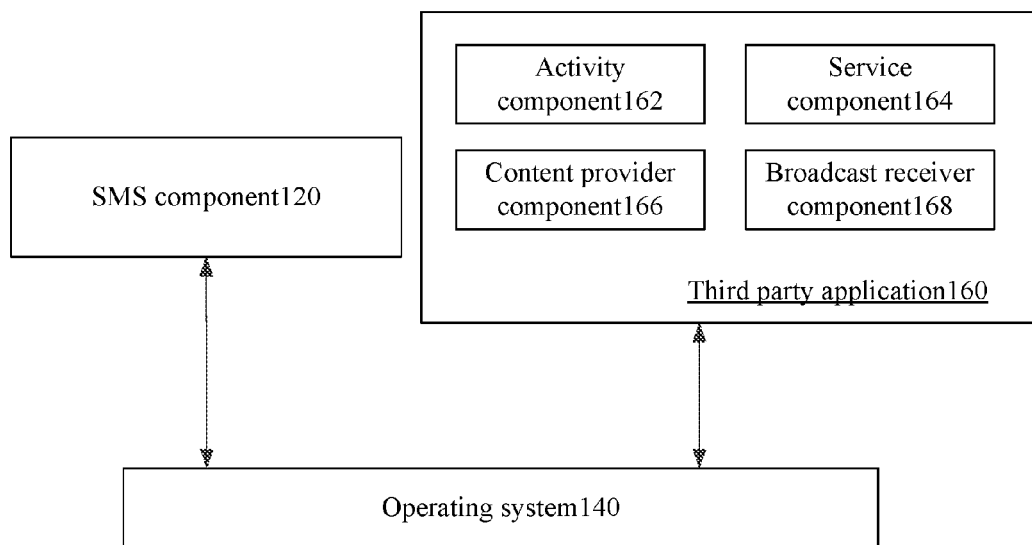
FIG. 1 is a schematic diagram of components of a mobile terminal according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Several terms involved in the embodiments of the present disclosure will be introduced briefly first.

Android operating system: a Linux-based operating system of free and open source codes, which is produced by Google and mainly applied to a mobile terminal. The mobile terminal may be a mobile phone, a tablet computer, an electronic book reader, a Moving Picture Experts Group Audio Layer III (MP3) player, a Moving Picture Experts Group Audio Layer IV (MP4) player, a portable laptop computer and so on.

Application: an application generally includes at least one program component in an Android operating system. There are four program components, an activity component, a service component, a content provider component and a broadcast receiver component.

Activity component: which is a component responsible for interacting with a user in an android application and providing a visible user interface for the Android application. One Android application may include more than one activity components.

Service component: which is a component operating in the background and not providing a user interface in an Android application. One Android application may include more than one service components.

Content provider component: which is a component configured to provide data, such as an SMS, a tone, a piece of wallpaper, contacts and so on, for other applications or for other components in a current application in an Android application. The content provider component may encapsulate data in various formats and provide the data to other applications or components in a standard form, wherein an SMS component in the embodiments of the present disclosure is a content provider component.

Broadcast receiver component: which is configured to receive and respond to a message which is broadcast by an operating system. The broadcast receiver component can receive a message of interest (or a message of a predefined message type) and then process and forward the message to other components in a current application.

Third party application: which is an application that is other than preinstalled applications of an operating system in a mobile terminal.

To facilitate understanding, please refer to FIG. 1 first, which shows a schematic diagram of components of a mobile terminal according to an exemplary embodiment. The mobile terminal includes an SMS component 120, an operating system 140 and a third party application 160. The operating system 140 receives a reading request from the third party application 160, and forwards the reading request to the SMS component 120.

The mobile terminal may be a mobile phone, a tablet computer, an electronic book reader, an MP3 player, an MP4 player, a portable laptop computer and so on.

The SMS component 120 is a content provider component in an Android application and is configured to provide SMS data for other applications or other components in a current application. The SMS component 120 may receive SMSs from a source party, and store the received SMSs to form an SMS list.

The operating system 140 pre-stores a configuration file, and the configuration file stores an SMS reading authority of the third party application 160 at the operating system level.

Alternatively or additionally, the operating system 140 stores a general configuration file. The general configuration file stores SMS reading authorities of all third party applications 160 at the operating system level.

Alternatively or additionally, the operating system 140 stores a plurality of configuration files, and the SMS reading authority of each third party application 160 at the operating system level respectively corresponds to a configuration file.

The third party application 160, when having the SMS reading authority at the operating system level, can read all SMSs in the SMS component 120, and the third party application 160 without the SMS reading authority at the operating system level cannot read any SMS in the SMS component 120.

The third party component 160 may include one or more program components, each of which may be any one of followings: an activity component 162, a service component 164, a content provider component 166 and a broadcast receiver component 168.

When the third party application 160 needs to read an SMS in the short message component 120, the third party application 160 sends a reading request to read the SMS to the operating system 140 first. After receiving the reading request, the operating system 140 detects whether the third party application 160 is in an SMS reading authority list, and when the third party application 160 is in the SMS reading authority list, the operating system 140 forwards to the SMS component 120 the SMS reading request sent by the third party application 160. After receiving the reading request of warded by the operating system 140, the SMS component 120 searches the SMS list, according to the SMS that needs to be read according to the reading request, for the SMS that needs to be read, and feeds back the found SMS to the third party application 160 through the operating system 140.

Figure 2:
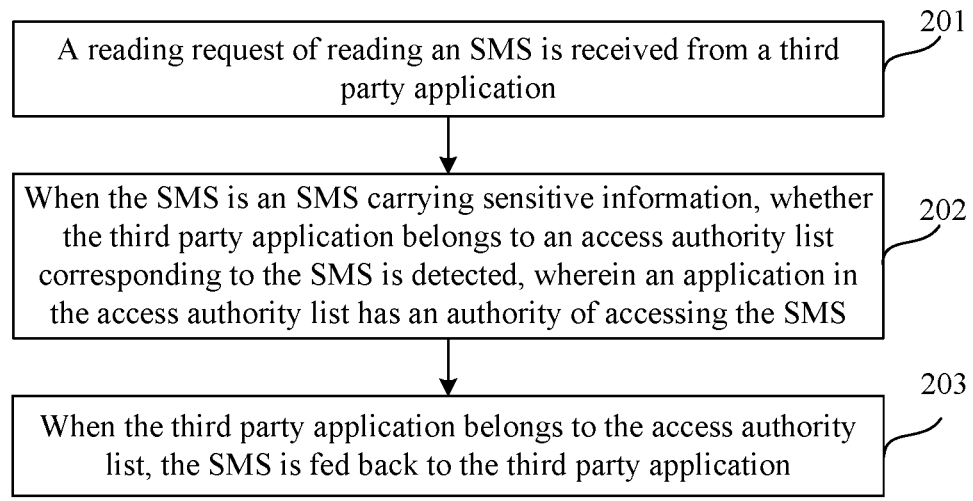
FIG. 2 is a flowchart of an SMS reading method according to an exemplary embodiment.

FIG. 2 is a flowchart of an SMS reading method according to an exemplary embodiment. The present embodiment illustrates the SMS reading method applied in the mobile terminal as shown in FIG. 1 as an example. The SMS reading method includes several steps as follows. The method may be implemented by a device such as a mobile device, a mobile phone, a tablet, etc.

Step 201: A reading request to read an SMS is received from a third party application. The device may receive the request to read the SMS from a wireless network or any other type of network.

The third party application may be an application in a configuration file of the operating system, and the configuration file is a file for performing authority control according to an at an application granularity level. Specifically, the authority for the third party application to access other resources (such as another application) is set in the configuration file at the application level. Thus the authority of the third party application access application such as an SMS application via the operating system configuration file is all or nothing: the operating system either may either allow the third party application to access the all functionality or all messages of the SMS application or completely deny access. The configuration file from the operating system is not suitable to control access below the application level, e.g., one SMS application function or an individual message by the third party application. The embodiment of FIG. 2, however, allows for access control at sub-application level, e.g., within the SMS application.

Step 202: When the SMS is an SMS carrying sensitive information, the device determines whether the third party application belongs to an access authority list corresponding to the SMS, where the access authority list includes one or more applications having an authority of accessing the SMS.

The access authority list is an authority list in the SMS component, and is a list for performing authority control according to a single SMS granularity level. For example, the access authority list may be different for each two different SMS messages.

Step 203: When the third party application belongs to the access authority list, the SMS is fed back to the third party application.

To sum up, in an SMS reading method provided in the present disclosure, a reading request to read an SMS is received from a third party application; when the SMS is an SMS carrying sensitive information, whether the third party application belongs to an access authority list corresponding to the SMS is detected, wherein an application in the access authority list has an authority of accessing the SMS; and when the third party application belongs to the access authority list, the SMS is fed back to the third party application, so that the problem that a malicious application can read a verification code in an SMS to acquire an authority of executing a sensitive operation due to the reason that a third party application only having an SMS reading authority at the operating system level may read all SMSs in an SMS component is solved; for an SMS carrying sensitive information, only a third party application having an access authority to the SMS can read the SMS content in the SMS, and otherwise, the sensitive information in the SMS cannot be read, thus avoiding leakage of the sensitive information in the SMS by implementing authority control below the SMS application level and at the granularity level of individual SMS.

Figure 3A:
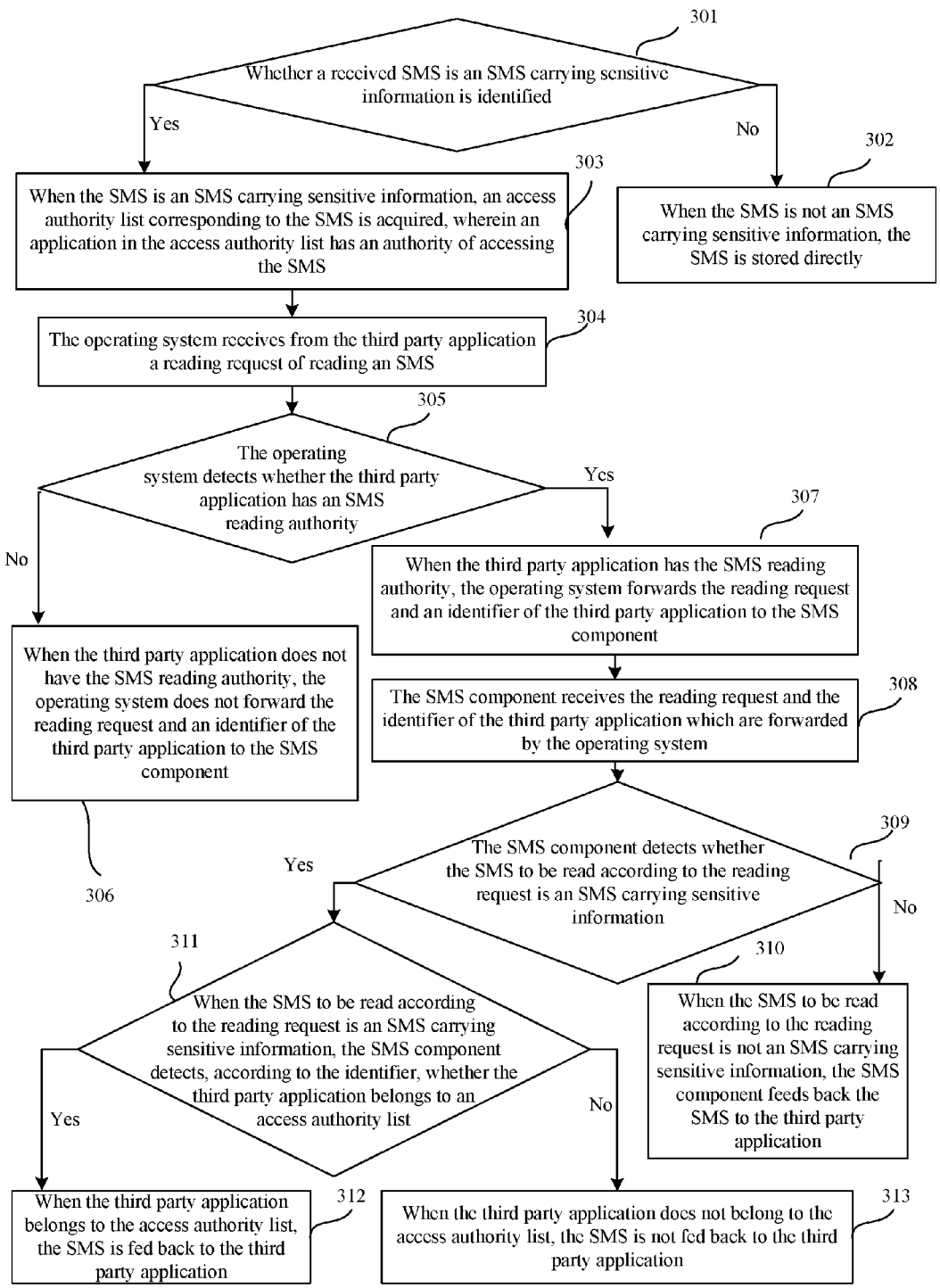
FIG. 3A is a flowchart of an SMS reading method according to another exemplary embodiment.

FIG. 3A is a flowchart of an SMS reading method according to another exemplary embodiment. The present embodiment illustrates the SMS reading method applied in the mobile terminal in the implementation environment as shown in FIG. 1 as an example. The SMS reading method includes several steps as follows.

Step 301: Whether a received SMS is an SMS carrying sensitive information is identified. The mobile terminal may determine whether the received SMS carries sensitive information based on the characteristic information of the SMS.

The sensitive information is information related to virtual properties and/or a control authority of a user in a network.

The SMS component receives an SMS from the source party of the SMS and identifies the received SMS so as to determine whether the SMS carries sensitive information.

The step that the SMS component identifies the SMS may include that the SMS component identifies, according to characteristic information of the SMS, whether the SMS is an SMS carrying sensitive information, wherein the characteristic information includes at least one of followings: a sender number, an SMS content and an SMS template.

Step 302: When the SMS is not an SMS carrying sensitive information, the SMS is stored directly. The mobile terminal may store the SMS directly in a unsecured memory when the SMS does not include sensitive information.

When the SMS is not an SMS carrying sensitive information, the SMS component stores the SMS directly.

Step 303: When the SMS is an SMS carrying sensitive information, an access authority list corresponding to the SMS is acquired, wherein an application in the access authority list has an authority of accessing the SMS. The mobile terminal may acquire an access authority list corresponding to the SMS when the SMS carries sensitive information.

When an identifying result indicates that the SMS is an SMS carrying sensitive information, the SMS component acquires, according to a source party of the SMS, an access authority list corresponding to the SMS, and an application in the access authority list has an authority to access the SMS.

Alternatively or additionally, the mobile terminal may pre-store source parties and corresponding access authority lists thereof. Alternatively or additionally, the mobile terminal regularly acquires, from a server, access authority lists corresponding to the source parties and updates old one with them.

Figure 3B:
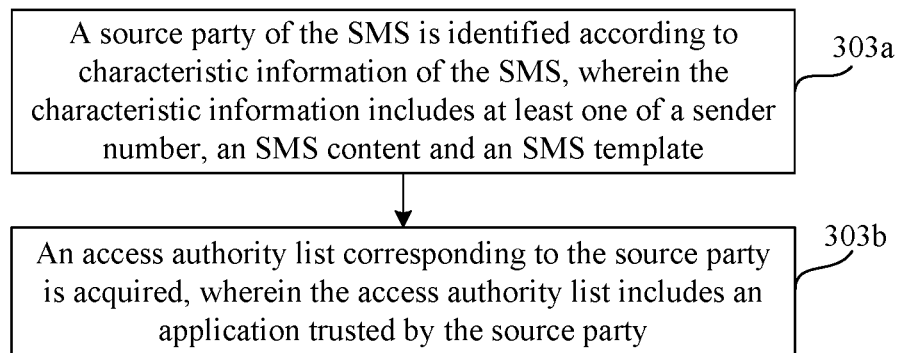
FIG. 3B is a flowchart of sub-steps of an SMS reading method according to still another exemplary embodiment.

In the one or more embodiments, Step 303 may include the following sub-steps, as shown in FIG. 3B.

Step 303a: A source party of the SMS is identified according to characteristic information of the SMS, wherein the characteristic information includes at least one of a sender number, an SMS content and an SMS template.

After identifying that the SMS is an SMS carrying sensitive information, the SMS component identifies a source party of the SMS according to characteristic information of the SMS, wherein the characteristic information includes at least one of a sender number, an SMS content and an SMS template.

Alternatively or additionally, the SMS component may acquire the source party of the SMS according to a sender number of the SMS. For example, a sender number is 95588, and the SMS component acquires, according to 95588 that the SMS is an SMS from Industrial and Commercial Bank of China, and the source party of the SMS is "Industrial and Commercial Bank of China".

Alternatively or additionally, the SMS component may acquire the source party of the SMS according to an SMS content of the SMS. For example, when the SMS content of the SMS carries a content that "you are paying using Xiaomi Payment, and your payment password is 100582", the SMS component may acquire, according to keywords "Xiaomi Payment", that the source party of the SMS is "Xiaomi Company".

Alternatively or additionally, the SMS component may further acquire the source party of the SMS according to an SMS template. The SMS component pre-stores a plurality of SMS templates carrying sensitive information, and stores source parties corresponding to the SMS templates. For example, an SMS template is "You are paying through Xiaomi Company, and the payment amount is xxxxx", then the SMS component stores the SMS template, and information indicating that the source party is "Xiaomi Company" will stored in a corresponding location of the SMS template. After identifying the SMS, the SMS component matches the SMS which is identified to carry the sensitive information with the stored SMS template, thereby acquiring a corresponding source party of the SMS.

Step 303b: An access authority list corresponding to the source party is acquired, wherein the access authority list includes an application trusted by the source party.

After acquiring the source party of the SMS, the SMS component acquires, according to the source party of the SMS, an access authority list corresponding to the source party. The access authority list includes an application trusted by the source party.

Exemplarily, applications trusted by the source party "Xiaomi Company" are as shown in the following Table 1.

TABLE 1

| Source party | Access authority list |
|---|---|
| Xiaomi Company | Xiaomi Payment |
| | Xiaomi Cinema |
| | Xiaomi Application |

TABLE 1-continued

| Store |
| --- |
| Xiomi Mall |

It may be learned from Table 1 that an access authority list corresponding to the source party "Xiaomi Company" includes 4 trusted applications, which are Xiaomi Payment, Xiaomi Cinema, Xiaomi Application Store and Xiomi Mall.

The SMS component marks the SMS as an SMS carrying sensitive information, and associates and stores a corresponding access authority list.

Step 304: The operating system receives from the third party application a reading request to read the SMS.

When the third party application needs to read an SMS in the SMS component, the third party application sends a reading request to read the SMS to the operating system first. Accordingly, the operating system receives the reading request to read the SMS from the third party application.

Here the third party application may be an SMS-class application, a payment-class application, a registration-class application, and so on, and the type of the third party application is not defined in the embodiments of the present disclosure.

Step 305: The operating system detects whether the third party application has an SMS reading authority.

The operating system pre-stores SMS reading authorities of third party applications, and when receiving a reading request to read an SMS from a certain third party application, the operating system acquires a pre-stored configuration file first, and detects whether the third party application is in the pre-stored configuration file. If the third party application is in the pre-stored configuration file, the third party application has an SMS reading authority. Otherwise, the third party application does not have the SMS reading authority.

Step 306: When the third party application does not have the SMS reading authority, the operating system does not forward the reading request and an identifier of the third party application to the SMS component.

Step 307: When the third party application has the SMS reading authority, the operating system forwards the reading request and an identifier of the third party application to the SMS component.

When it is detected by the operating system that the third party application has the SMS reading authority at the operating system level, the operating system acquires, from the reading request sent by the third party application, the identifier of the third party application, and forwards, to the operating system, the reading request of the third party application and the acquired identifier of the third party application.

Information forwarded by the operating system to the SMS component includes two contents, which are the SMS reading request sent by the third party application and the identifier of the third party application.

Alternatively or additionally, the operating system adds the identifier of the third party application to the reading request, and forwards, to the SMS component, the reading request carrying the identifier of the third party application.

Step 308: The SMS component receives the reading request and the identifier of the third party application which are forwarded by the operating system.

The SMS component receives the reading request and the identifier of the third party application which are forwarded by the operating system.

Alternatively or additionally, the SMS component receives the reading request which is forwarded by the operating system and carries the identifier of the third party application.

For example, if a third party application"Xiaomi Mall" sends to the operating system an SMS of reading an payment password in"Xiaomi Payment" in the SMS component, then after receiving the reading request, the operating system detects whether "Xiaomi Mall" has an SMS reading authority in the operating system, and when "Xiaomi Mall" has an SMS reading authority, forwards the reading request sent by "Xiaomi Mall" and an identifier of "Xiaomi Mall" to the SMS component. The SMS component receives the reading request and the identifier of "Xiaomi Mall" which are forwarded by the operating system.

Step 309: The SMS component detects whether the SMS required to be read according to the reading request is an SMS carrying sensitive information.

The SMS component acquires, according to the received reading request, the SMS required to be read in the reading request and detects whether the SMS required to be read in the reading request carries a marker. When a marker is carried, the SMS is an SMS carrying sensitive information, and otherwise, the SMS is not an SMS carrying sensitive information.

Step 310: When the SMS required to be read in the reading request is not an SMS carrying sensitive information, the SMS component feeds back the SMS to the third party application.

Step 311: When the SMS required to be read in the reading request is an SMS carrying sensitive information, the SMS component detects, according to the identifier, whether the third party application belongs to an access authority list.

When the SMS required to be read in the reading request is an SMS carrying sensitive information, the SMS component acquires an access authority list of SMSs carrying sensitive information, and detects whether the identifier of the third party application is in the access authority list. An application in the access authority list has an authority of accessing the SMS.

Step 312: When the third party application belongs to the access authority list, the SMS is fed back to the third party application.

When it is detected by the SMS component that the identifier of the third party application is in the access authority list, the SMS component feeds back the SMS carrying the sensitive information to the corresponding third party application.

Step 313: When the third party application does not belong to the access authority list, the SMS is not fed back to the third party application.

It needs to be noted that: Step 301 to Step 303 and Step 304 to Step 308 in the one or more embodiments are not limited to specific sequences in the present disclosure. In other words, the step that the SMS component determines whether the SMS is an SMS carrying sensitive information may be performed after the step that the reading request of warded by the operating system is received, and whether the SMS is an SMS carrying sensitive information may be pre-identified before the reading request of warded by the operating system is received.

To sum up, in the SMS reading method provided in the embodiment of the present disclosure, a reading request to read an SMS is received from a third party application; when the SMS is an SMS carrying sensitive information, whether the third party application belongs to an access authority list corresponding to the SMS is detected, wherein an application in the access authority list has an authority of accessing the SMS; and when the third party application belongs to the access authority list, the SMS is fed back to the third party application, so that the problem that a malicious application can read a verification code in an SMS to acquire an authority of executing a sensitive operation due to the reason that a third party application only having an SMS reading authority at the operating system level may read all SMSs in an SMS component is solved, and for an SMS carrying sensitive information, only a third party application having an authority of accessing to the SMS can read an SMS content in the SMS, and otherwise, the sensitive information in the SMS cannot be read, thus avoiding leakage of the sensitive information in the SMS while implementing authority control over a single SMS granularity.

The reading request and an identifier of the third party application are forwarded by an operating system to an SMS component, so that the SMS component detects, according to the identifier of the third party application, whether the third party application has an SMS access authority, and the third party application needs to have access authorities of two levels to read the sensitive information.

An access authority list to control access at a granularity level of a single SMS is added only to the SMS component (rather than the operating system), thus implementing authority control at a single SMS granularity level, and achieving the effect of simple and convenient operation and easy implementation.

In the embodiment of FIG. 3A, the SMS component determines whether the SMS is an SMS carrying sensitive information according to several methods as follows in Step 301.

Alternatively or additionally, the SMS component may determine, according to a sender number of the received SMS, whether the SMS carries sensitive information. Generally, a list is stored in an SMS background server. For example, the list stores company A and SMS number 1 and SMS number 2 which are SMS numbers corresponding to company A, company B and SMS number 3 and SMS number 4 which are SMS numbers corresponding to company B, company C and SMS number 5 and SMS number 6 which are SMS numbers corresponding to company C, and so on.

Exemplarily, the list stored in the SMS background server is as shown in the following Table 2.

TABLE 2

| Company name | SMS number |
| --- | --- |
| Company A | SMS number 1 |
|  | SMS number 2 |
| Company B | SMS number 3 |
|  | SMS number 4 |
| Company C | SMS number 5 |
|  | SMS number 6 |

When the sender number of the SMS received by the SMS component is SMS number 5, it can be learned from the corresponding relations in Table 2 that the source party of the SMS is company C, and the SMS component identifies the SMS as an SMS carrying sensitive information.

Alternatively or additionally, the SMS component may determine, according to an SMS content of the received SMS, whether the SMS carries sensitive information. For example, the SMS content is "[Asan Travel•Go] 06-22 07:15 Kunming Changshui Airport-take-off-08:55 and Chongqing Jiangbei Airport 2B landing Lucky Airlines 8L9863, Order XXXXXXXXXXX, paying, Zhang Wuji (Ticket number: XXX-XXXXXXXXXXX) Click on http://tb.cn/3eXI06y, and check details of the flight on the client", then the SMS component identifies, according to keywords [Asan Travel•Go] in the SMS content, that the SMS is an SMS carrying sensitive information.

Alternatively or additionally, the SMS component may also determine, according to an SMS template, whether the SMS carries sensitive information. For example, the SMS component pre-stores a plurality of SMS templates carrying sensitive information. When the SMS is received, the SMS component matches the received SMS with a stored SMS template. When the received SMS is matched with a certain SMS template, the SMS is identified as an SMS carrying sensitive information.

For example, SMS 1: sender: 140000621 "[Company A] order number paying, the verification code is. Click on http://tb.cn/3eXI06y, and check details on the client."

SMS 2: sender: 140000622 "[Company A] order number paying, the verification code is XXXXX. Click on http://tb.cn/3eXI06y, and check details on the client."

SMS 1 and SMS 2 are SMSs sent by Jingdong Company, the source party identifier of SMS 1 is "140000621", the source party identifier of SMS 2 is "140000622" and the two source parties have the same prefix "1400062". In the meanwhile, the two SMSs contain a keyword "[Company A]".

Exemplarily, two SMS templates constructed by SMS 1 and SMS 2 are as follows.

<payment template 1>4 "[Company A]<Order number> <Verification code>."

<Payment template 2>4 "[Company A]<Order number> <Verification code>."

Exemplarily, corresponding relations between extracted templates and combinations of keywords and identification characteristics of the senders of the SMSs are as shown in the following Table 3.

TABLE 3

| SMS characteristic | SMS template |
| --- | --- |
| 14000062X + [Company A] | <payment template 1> |
| 14000062X + [Company A] | <payment template 2> |

When the SMS received by the SMS component carries a characteristic of "14000062X+[Company A]", the SMS will be matched with <payment template 2> in the SMS templates. Therefore, the SMS component identifies the SMS as an SMS carrying sensitive information.

Figure 4:
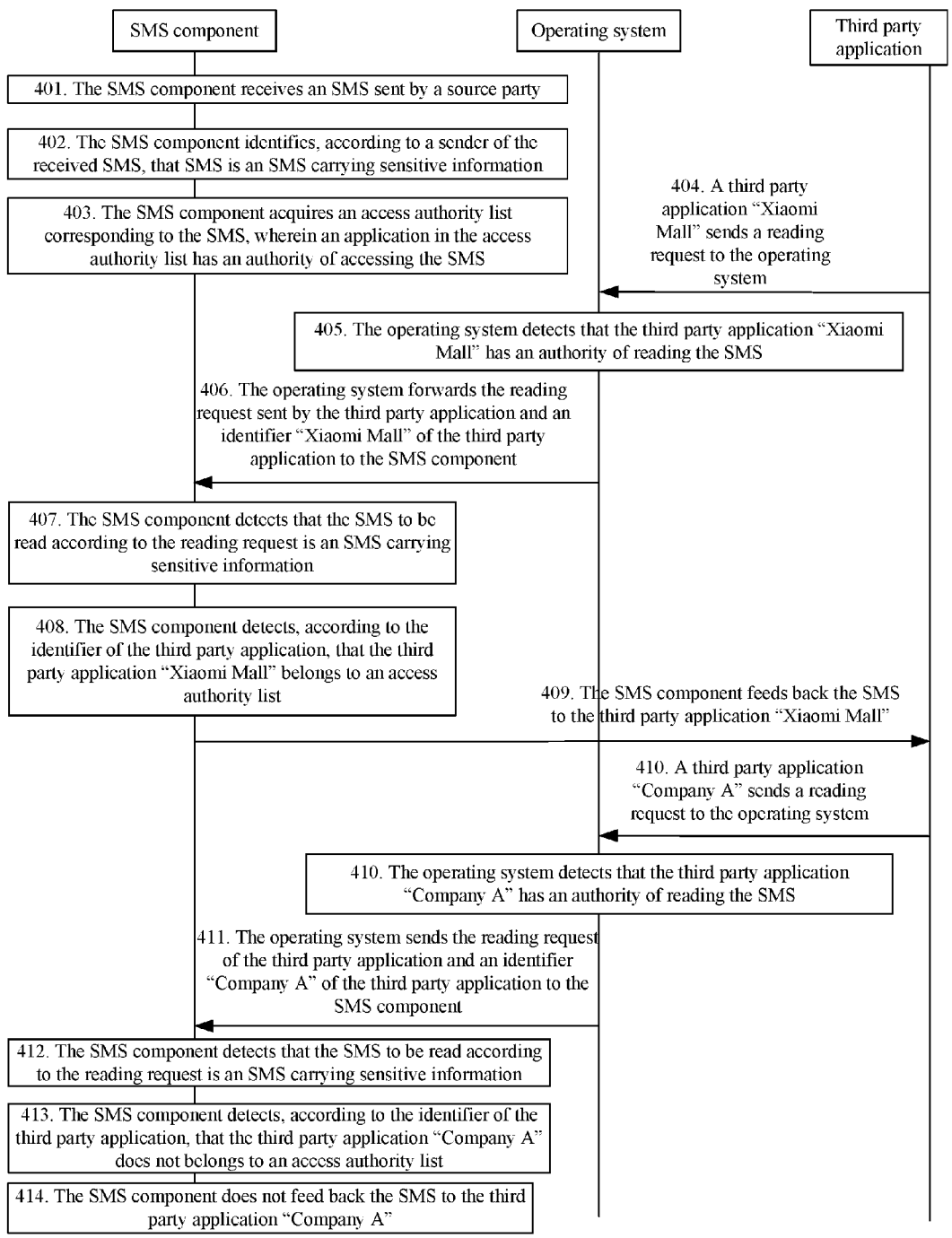
FIG. 4 is a flowchart of an SMS reading method according to yet another exemplary embodiment.

For example, after a product is purchased in Xiaomi Mall, an order is submitted by clicking, acquisition of a verification code from a mobile phone is selected during payment, and a mobile phone bound with the website of Xiaomi Mall will receive a SMS containing a verification code from Xiaomi Company within 60 seconds. Provided that the received SMS is: Sender: 160000621 "[Xiaomi Company] Order number XXXXXXXXXXX, paying, the verification code is XXXXXX. Click on http://tb.cn/3eXI06y, and check details on the client." Then the whole SMS reading process is as shown in FIG. 4.

Step 401: The SMS component receives an SMS sent by a source party.

Step 402: The SMS component identifies, according to a sender of the received SMS, that SMS is an SMS carrying sensitive information.

The SMS identifies, according to a sender 160000621 of the SMS, that the SMS carries information of a verification code. In other words, the SMS is an SMS carrying sensitive information.

Step 403: The SMS component acquires an access authority list corresponding to the SMS, wherein an application in the access authority list has an authority of accessing the SMS.

The SMS component acquires, according to "[Xiaomi Company] Order number XXXXXXXXXXX paying, the verification code is XXXXX. Click on http://tb.cn/3eXI06y, and check details on the client." in the SMS, that the source party of the SMS is "Xiaomi Company" and acquires an access authority list corresponding to Xiaomi Company.

Step 404: A third party application "Xiaomi Mall" sends a reading request to the operating system.

Accordingly, the operating system receives the reading request to read an SMS from the third party application "Xiaomi Mall".

Step 405: The operating system detects that the third party application "Xiaomi Mall" has an authority to read the SMS.

Step 406: The operating system forwards the reading request sent by the third party application and an identifier "Xiaomi Mall" of the third party application to the SMS component.

Step 407: The SMS component detects that the SMS required to be read according to the reading request is an SMS carrying sensitive information.

Step 408: The SMS component detects, according to the identifier of the third party application, that the third party application "Xiaomi Mall" belongs to an access authority list.

Step 409: The SMS component feeds back the SMS to the third party application "Xiaomi Mall".

Step 410: A third party application "Company A" sends a reading request to the operating system.

Accordingly, the operating system receives the reading request to read an SMS from the third party application "Company A".

Step 410: The operating system detects that the third party application "Company A" has an authority to read the SMS.

Step 411: The operating system sends the reading request of the third party application and an identifier "Company A" of the third party application to the SMS component.

Step 412: The SMS component detects that the SMS required to be read according to the reading request is an SMS carrying sensitive information.

Step 413: The SMS component detects, according to the identifier of the third party application, that the third party application "Company A" does not belong to an access authority list.

Step 414: The SMS component does not feed back the SMS to the third party application "Company A".

Figure 5:
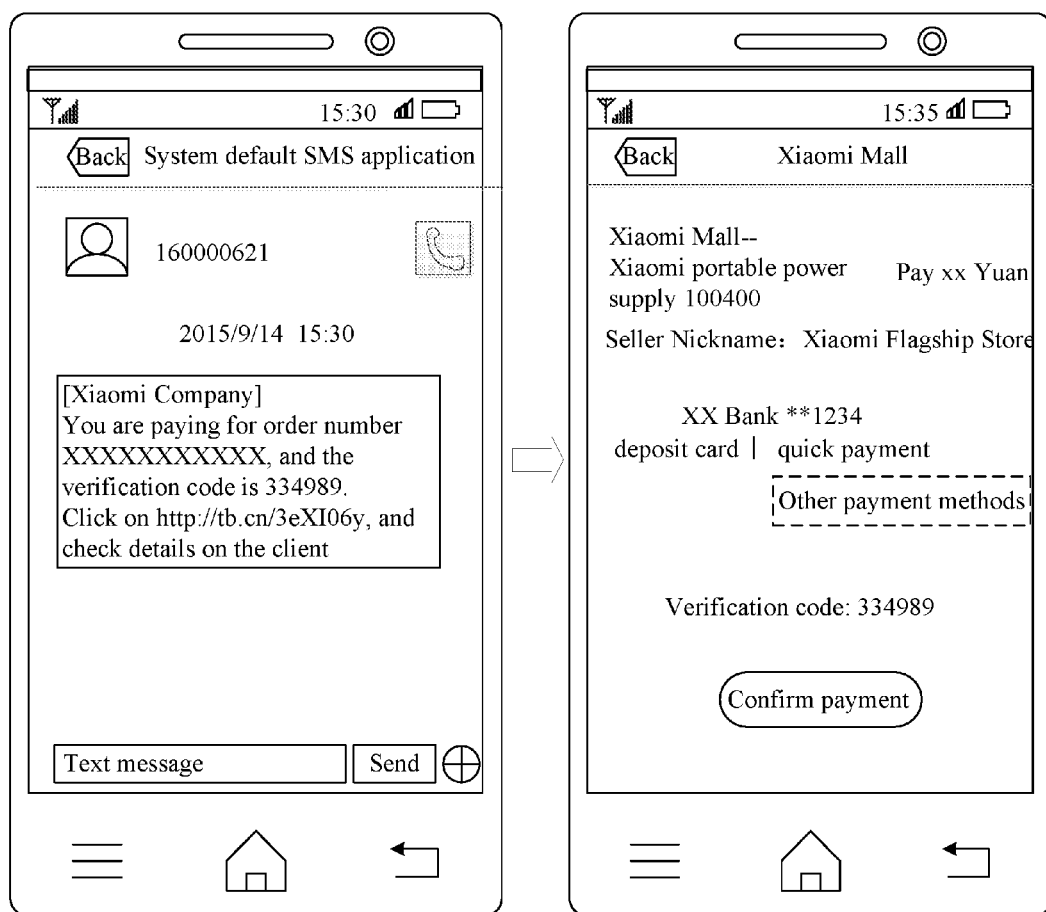
FIG. 5 is a schematic diagram of an interface illustrating an SMS reading method according to yet still another exemplary embodiment.

The schematic diagram of an interface illustrating a successful SMS reading process, which is shown in FIG. 4, is as shown in FIG. 5.

The following description refers to device embodiments of the present disclosure, which may be configured to execute the method embodiments of the present disclosure. Please refer to the method embodiments of the present disclosure for details not disclosed in the device embodiments of the present disclosure.

Figure 6:
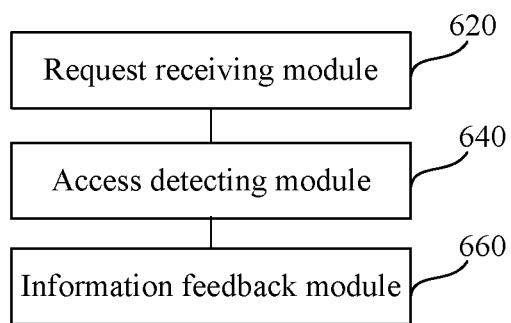
FIG. 6 is a block diagram of an SMS reading device according to an exemplary embodiment.

FIG. 6 is a block diagram of an SMS reading device according to an exemplary embodiment. The SMS reading device may be implemented as a mobile terminal or a part of the mobile terminal with a combination of software and hardware. The SMS reading device includes, but is not limited to:

a request receiving module 620, configured to receive, from a third party application, a reading request to read an SMS;

an access determining module 640 configured to determine, when the SMS is an SMS carrying sensitive information, whether the third party application belongs to an access authority list corresponding to the SMS, wherein an application in the access authority list has an authority of accessing the SMS; and an information feedback module 660 configured to, when the third party application belongs to the access authority list, feed back the SMS to the third party application.

To sum up, in the SMS reading device provided in the embodiment of the present disclosure, a reading request to read an SMS is received from a third party application; when the SMS is an SMS carrying sensitive information, whether the third party application belongs to an access authority list corresponding to the SMS is detected, wherein an application in the access authority list has an authority of accessing the SMS; and when the third party application belongs to the access authority list, the SMS is fed back to the third party application, so that the problem that a malicious application can read a verification code in an SMS to acquire an authority of executing a sensitive operation due to the reason that a third party application only having an SMS reading authority at the operating system level may read all SMSs in an SMS component is solved, and for an SMS carrying sensitive information, only a third party application having an authority of accessing to the SMS can read the SMS content in the SMS, and otherwise, the sensitive information in the SMS cannot be read, thus avoiding leakage of the sensitive information in the SMS while implementing authority control at a single SMS granularity level.

Figure 7:
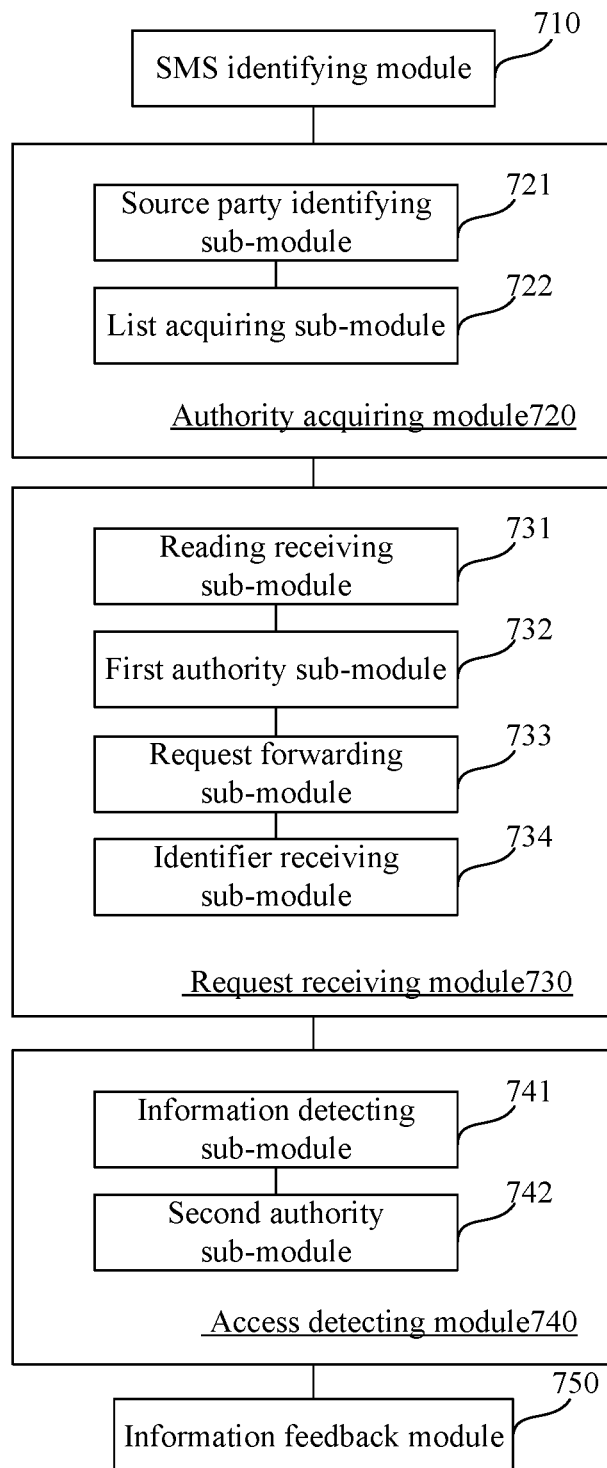
FIG. 7 is a block diagram of an SMS reading device according to another exemplary embodiment.

FIG. 7 is a block diagram of an SMS reading device according to another exemplary embodiment. The SMS reading device may be implemented as a mobile terminal or a part of the mobile terminal by a combination of software and hardware. The SMS reading device includes, but is not limited to:

an SMS identifying module 710, configured to determine whether a received SMS is an SMS carrying sensitive information;

alternatively, the SMS identifying module 710 is further configured to determine, according to characteristic information of the SMS, whether the SMS is an SMS carrying sensitive information, wherein the characteristic information includes at least one of a sender number, an SMS content and an SMS template;

an authority acquiring module 720 configured to acquire, when the SMS is an SMS carrying sensitive information, an access authority list corresponding to the SMS, wherein an application in the access authority list has an authority of accessing the SMS.

Alternatively or additionally, the authority acquiring module 720 includes:

a source party identifying sub-module 721, configured to identify a source party of the SMS according to characteristic information of the SMS, wherein the characteristic information includes at least one of a sender number, an SMS content and an SMS template; and a list acquiring sub-module 722, configured to acquire an access authority list corresponding to the source party, wherein the access authority list includes an application trusted by the source party; and a request receiving module 730, configured to receive, from a third party application, a reading request to read an SMS.

Alternatively or additionally, the request receiving module 730 includes:

a reading receiving sub-module 731, configured to receive the reading request to read the SMS from the third party application through an operating system;

a first authority sub-module 732 configured to determine, through the operating system, whether the third party application has an SMS reading authority;

a request forwarding sub-module 733 configured to forward, when the third party application has the SMS reading authority, the reading request and an identifier of the third party application to an SMS component through the operating system;

an identifier receiving sub-module 734 configured to receive, through the SMS component, the reading request and the identifier of the third party application which are forwarded by the operating system; and an access determining module 740, configured to determine, when the SMS is an SMS carrying sensitive information, whether the third party application belongs to an access authority list corresponding to the SMS, wherein an application in the access authority list has an authority of accessing the SMS.

Alternatively or additionally, the access determining module 740 includes:

an information determining sub-module 741 configured to determine, through the SMS component, whether the SMS to be read according to the reading request is an SMS carrying sensitive information;

a second authority sub-module 742 configured to, when the SMS to be read according to the reading request is an SMS carrying sensitive information, determine whether the third party application belongs to the access authority list according to the identifier; and an information feedback module 750 configured to, when the third party application belongs to the access authority list, feed back the SMS to the third party application.

To sum up, in the SMS reading device provided in the embodiment of the present disclosure, a reading request to read an SMS is received from a third party application; when the SMS is an SMS carrying sensitive information, whether the third party application belongs to an access authority list corresponding to the SMS is detected, wherein an application in the access authority list has an authority of accessing the SMS; and when the third party application belongs to the access authority list, the SMS is fed back to the third party application, so that the problem that a malicious application can read a verification code in an SMS to acquire an authority of executing a sensitive operation due to the reason that a third party application only having an SMS reading authority at the operating system level may read all SMSs in an SMS component is solved, and for an SMS carrying sensitive information, only a third party application having an access authority to the SMS can read the SMS content in the SMS, and otherwise, the sensitive information in the SMS cannot be read, thus avoiding leakage of the sensitive information in the SMS while implementing authority control at a single SMS granularity level.

The reading request and an identifier of the third party application are forwarded by an operating system to an SMS component, so that the SMS component detects, according to the identifier of the third party application, whether the third party application has an SMS access authority, and the third party application needs to have access authorities of two levels to read the sensitive information.

An access authority list controlling access at a single SMS granularity level is added only to the SMS component, thus implementing authority control over a single SMS granularity, and enabling simple and convenient operation and easy implementation.

Specific methods for modules in the devices in the embodiments above to execute operations have been expounded in the embodiments related to the method, and will not be elaborated and described in details herein.

The present disclosure further provides an SMS reading device. The device may be configured to implement an SMS reading method provided by one or more embodiments of the present disclosure. The device includes a processor, and a memory configured to store an instruction executable by the processor;

wherein the processor is configured to:

receive, from a third party application, a reading request to read an SMS;

when the SMS is an SMS carrying sensitive information, determine whether the third party application belongs to an access authority list corresponding to the SMS, wherein an application in the access authority list has an authority of accessing the SMS; and when the third party application belongs to the access authority list, feed back the SMS to the third party application.

Figure 8:
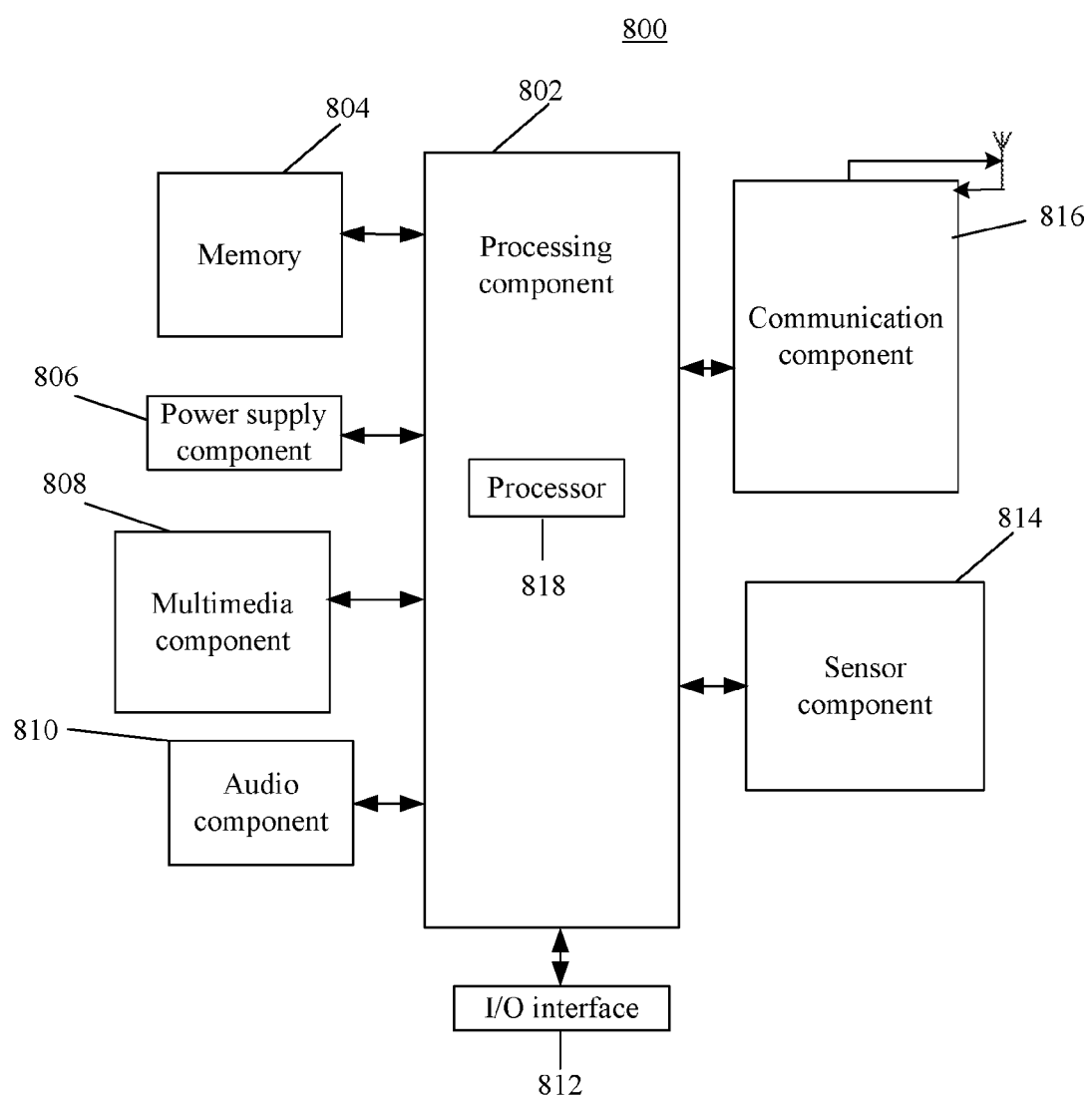
FIG. 8 is a block diagram of an SMS reading device according to an exemplary embodiment.

FIG. 8 is a block diagram of an SMS reading device according to an exemplary embodiment. For example, the device 800 may be a mobile phone, a computer, a digital broadcasting terminal, a message transceiver, a game console, a tablet device, a medical device, a fitness device, a personal digital assistant and so on.

Referring to FIG. 8, the device 800 may include one or more of the following components: a processing component 802, a memory 804, a power component 806, a multimedia component 808, an audio component 810, an Input/Output (I/O) interface 812, a sensor component 814 and a communication component 816.

Generally, the processing component 802 controls overall operations of the device 800, such as operations associated with display, a telephone call, data communication, a camera operation and a recording operation. The processing component 802 may include one or more processors 818 to execute instructions so as to perform all or part of the steps of the method. Besides, the processing component 802 may include one or more modules, so as to process interaction between the processing component 802 and other components. For example, the processing component 802 may include a multimedia module so as to facilitate interaction between the multimedia component 808 and the processing component 802.

The memory 804 is configured to store various types of data so as to support operations in the device 800. Examples of such data include instructions for any applications or methods operated on the device 800, contact data, phonebook data, messages, pictures, video, etc. The memory 804 may be implemented using any type of volatile or non-volatile memory devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the device 800. The power component 806 may include a power management system, one or more power sources, and other components associated with power generation, management and distribution of the device 800.

The multimedia component 808 includes a screen providing an output interface between the device 800 and a user. In some embodiments, the screen may include a Liquid Crystal Display (LCD) and a Touch Panel (TP). When the screen includes the TP, the screen may be implemented as a touch screen to receive an input signal from the user. The TP includes one or more touch sensors so as to sense a touch, a slide and a gesture on the TP. The touch sensor may not only sense a touch or a boundary of a slide, but also detect a duration and a pressure related to the touch or the slide. In some embodiments, the multimedia component 808 includes a front camera and/or a rear camera. When the device 800 is in an operation mode, such as a camera mode or a video mode, the front camera and/or the rear camera may receive external multimedia data. Each of the front camera and the rear camera may be a fixed optical lens system or have focus and optical zoom capability.

The audio component 810 is configured to output and/or input an audio signal. For example, the audio component 810 includes a Microphone (MIC). When the device 800 is in an operation mode, such as a calling mode, a recording mode and a voice recognition mode, the MIC is configured to receive an external audio signal. The received audio signal may be further stored in the memory 804 or sent by the communication component 816. In some embodiments, the audio component 810 further includes a loudspeaker, configured to output the audio signal.

The I/O interface 812 provides an interface between the processing component 802 and peripheral interface modules, such as a keyboard, a click wheel, buttons and so on. The buttons may include, but are not limited to a home button, a volume button, a starting button and a locking button.

The sensor component 814 includes one or more sensors configured to provide status assessments of various aspects of the device 800. For example, the sensor component 814 may detect an open/closed state of the device 800, and the relative locations of the components. For example, the components are the display and the keypad of the device 800. The sensor component 814 may further detect a change in position of the device 800 or a component of the device 800, a presence of contact between the user and the device 800, an orientation or an acceleration/deceleration of the device 800 and a change in the temperature of the device 800. The sensor component 814 may include a proximity sensor, configured to detect the presence of a nearby object without any physical contact. The sensor component 814 may further include an optical sensor, such as a Complementary Metal Oxide Semiconductor (CMOS) or Charge Coupled Device (CCD) image sensor used in an imaging application. In some embodiments, the sensor component 814 may further include an acceleration sensor, a gyro sensor, a magnetic sensor, a pressure sensor or a temperature sensor.

The communication component 816 is configured to facilitate wired or wireless communication between the device 800 and other devices. The device 800 may be accessed into a wireless network based on a communication standard, such as Wireless Fidelity (WiFi), the second Generation (2G) or the third Generation (3G), or a combination thereof. In an exemplary embodiment, the communication component 816 receives a broadcast signal from an external broadcast management system or broadcast related information through a broadcast channel. In an exemplary embodiment, the communication component 816 further includes a Near Field Communication (NFC) module so as to promote short distance communication. For example, the NFC module may be implemented based on a Radio-frequency Identification (RFID) technology, an Infrared Data Association (IrDA) technology, an Ultra Wide Band (UWB) technology, a Bluetooth (BT) technology and other technologies.

In an exemplary embodiment, the device 800 may be implemented with processing circuitry including one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, and configured to execute the SMS reading methods above. Each module or sub-module discussed above, such as the request receiving module 620 and the access determining module 640, may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example In exemplary embodiments, there is also provided a non-transitory computer-readable storage medium including instructions, such as included in the memory 804, executable by the processor 820 in the device 800, for performing the above-described methods. For example, the non-temporary computer readable storage medium may be a ROM, a Random-Access Memory (RAM), a Compact Disc-ROM (CD-ROM), a magnetic tape, a floppy disk, an optical data memory and so on.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

In the embodiments of the present disclosure, whether a received SMS is an SMS carrying sensitive information is identified; when the SMS is an SMS carrying sensitive information, an access authority list corresponding to the SMS is acquired, wherein an application in the access authority list has an authority of accessing the SMS; a reading request to read the SMS is received from a third party application, whether the third party application belongs to the access authority list is detected, and when the third party application belongs to the access authority list, the SMS is fed back to the third party application, so that the problem that a malicious application can read a verification code in an SMS to acquire an authority of executing a sensitive operation due to the reason that a third party application only having an SMS reading authority at the operating system level may read the content of an SMS in an SMS component is solved; for an SMS carrying sensitive information, only a third party application having an authority of accessing the SMS can read the content in the SMS, thus avoiding leakage of the sensitive information in the SMS while implementing authority control over a single SMS.

What is claimed is:

1. A method for reading a Short Message Service (SMS), comprising:
   receiving, by an operating system of a device comprising a processor, a reading request from a third party application to read an SMS;
   determining, by the operating system, whether the third party application has an SMS reading authority at an operating system level;
   when the third party application is determined to have the SMS reading authority at the operating system level, forwarding, by the operating system, the reading request and an identifier of the third party application to an SMS component, wherein the SMS component is a content provider component running on the operating system and configured to control access to SMS data for applications running on the operating system;
   determining, by the SMS component, whether the SMS includes sensitive information;
   when the SMS is determined to include sensitive information, determining by the SMS component, whether the third party application belongs to an access authority list corresponding to the SMS, wherein the access authority list comprises one or more applications having an authority of accessing the SMS; and
   when the third party application is determined to belong to the access authority list, feeding back, by the SMS component, the SMS to the third party application;
   wherein the access authority list is an authority list in the SMS component, and is a list for performing authority control according to a single SMS granularity level.

2. The method according to claim 1, further comprising:
   receiving, through the SMS component, the reading request and the identifier of the third party application which are forwarded by the operating system.

3. The method according to claim 2, further comprising:
   when the SMS is an SMS carrying sensitive information, determining, according to the identifier, whether the third party application belongs to the access authority list.

4. The method according to claim 1, further comprising:
   when the SMS is an SMS carrying sensitive information, acquiring the access authority list corresponding to the SMS.

5. The method according to claim 2, further comprising:
   when the SMS is an SMS carrying sensitive information, acquiring the access authority list corresponding to the SMS.

6. The method according to claim 3, further comprising:
   when the SMS is an SMS carrying sensitive information, acquiring the access authority list corresponding to the SMS.

7. The method according to claim 4, wherein when the SMS is an SMS carrying sensitive information, acquiring the access authority list corresponding to the SMS comprises:
   identifying a source party of the SMS according to characteristic information of the SMS, wherein the characteristic information comprises at least one of a sender number, an SMS content and an SMS template; and
   acquiring an access authority list corresponding to the source party, wherein the access authority list comprises an application trusted by the source party.

8. The method according to claim 5, wherein when the SMS is an SMS carrying sensitive information, acquiring the access authority list corresponding to the SMS comprises:
   identifying a source party of the SMS according to characteristic information of the SMS, wherein the characteristic information comprises at least one of a sender number, an SMS content and an SMS template; and
   acquiring an access authority list corresponding to the source party, wherein the access authority list comprises an application trusted by the source party.

9. The method according to claim 6, wherein when the SMS is an SMS carrying sensitive information, acquiring the access authority list corresponding to the SMS comprises:
   identifying a source party of the SMS according to characteristic information of the SMS, wherein the characteristic information comprises at least one of a sender number, an SMS content and an SMS template; and
   acquiring an access authority list corresponding to the source party, wherein the access authority list comprises an application trusted by the source party.

10. The method according to claim 4, wherein determining whether the received SMS is an SMS carrying sensitive information comprises:
    determining, according to characteristic information of the SMS, whether the SMS is an SMS carrying sensitive information, wherein the characteristic information comprises at least one of a sender number, an SMS content and an SMS template.

11. A device for reading a Short Message Service (SMS), wherein the device comprises:
    a processor; and
    a memory configured to store an instruction executable by the processor,
    wherein the processor is configured to:
      receive, from a third party application, a reading request to read an SMS through an operating system;
      determine, through the operating system, whether the third party application has an SMS reading authority at an operating system level;
      when the third party application is determined to have the SMS reading authority at the operating system level, forward, by the operating system the reading request and an identifier of the third party application to an SMS component through the operating system, wherein the SMS component is a content provider component running on the operating system and configured to control access to SMS data for applications running on the operating system;
      determine, through the SMS component, whether the SMS includes sensitive information;
      when the SMS is determined to include sensitive information, determine, through the SMS component, whether the third party application belongs to an access authority list corresponding to the SMS, wherein the access authority list comprises one or more applications having an authority of accessing the SMS; and when the third party application is determined to belong to the access authority list, feed back, through the SMS component, the SMS to the third party application;

wherein the access authority list is an authority list in the SMS component, and is a list for performing authority control according to a single SMS granularity level.

12. The device according to claim 11, wherein the processor is further configured to:

receive, through the SMS component, the reading request and the identifier of the third party application which are forwarded by the operating system.

13. The device according to claim 12, wherein the processor is further configured to:

when the SMS to be read according to the reading request is an SMS carrying sensitive information, determining, according to the identifier, whether the third party application belongs to the access authority list.

14. The device according to claim 11, wherein the processor is further configured to:

when the SMS is an SMS carrying sensitive information, acquire the access authority list corresponding to the SMS.

15. The device according to claim 12, wherein the processor is further configured to:

when the SMS is an SMS carrying sensitive information, acquire the access authority list corresponding to the SMS.

16. The device according to claim 13, wherein the processor is further configured to:

when the SMS is an SMS carrying sensitive information, acquire the access authority list corresponding to the SMS.

17. The device according to claim 14, wherein the processor is further configured to:

identify a source party of the SMS according to characteristic information of the SMS, wherein the characteristic information comprises at least one of a sender number, an SMS content and an SMS template; and acquire an access authority list corresponding to the source party, wherein the access authority list comprises an application trusted by the source party.

18. The device according to claim 15, wherein the processor is further configured to:

identify a source party of the SMS according to characteristic information of the SMS, wherein the characteristic information comprises at least one of a sender number, an SMS content and an SMS template; and acquire an access authority list corresponding to the source party, wherein the access authority list comprises an application trusted by the source party.

19. The device according to claim 14, wherein the processor is further configured to:

determine, according to characteristic information of the SMS, whether the SMS is an SMS carrying sensitive information, wherein the characteristic information comprises at least one of a sender number, an SMS content and an SMS template.

20. A non-transitory computer-readable storage medium comprising instructions that, when executed by a processor of a mobile terminal, causes the mobile terminal to:

receive, by an operating system, from a third party application, a reading request to read an Short Message Service (SMS);

determine, by the operating system, whether the third party application has an SMS reading authority at an operating system level;

when the third party application is determined to have the SMS reading authority, forward, by the operating system, the reading request and an identifier of the third party application to an SMS component, wherein the SMS component is a content provider component running on the operating system and configured to control access to SMS data for applications running on the operating system;

determine, by the SMS component, whether the SMS includes sensitive information;

when the SMS is determined to include sensitive information, determine whether the third party application belongs to an access authority list corresponding to the SMS, wherein the access authority list comprises one or more applications having an authority of accessing the SMS; and when the third party application is determined to belong to the access authority list, feed back, by the SMS component, the SMS to the third party application;

wherein the access authority list is an authority list in the SMS component, and is a list for performing authority control according to a single SMS granularity level.

* * * * *